United States Patent [19]

Norton

[11] Patent Number: 4,769,135

[45] Date of Patent: Sep. 6, 1988

[54] AUTOMATIC METERING SYSTEM

[75] Inventor: William W. Norton, Lincolnshire, Ill.

[73] Assignee: Culligan International Company, Northbrook, Ill.

[21] Appl. No.: 20,348

[22] Filed: Mar. 2, 1987

[51] Int. Cl.[4] .................... B01D 35/00; G01F 15/12; G01F 1/06

[52] U.S. Cl. ....................... 210/88; 210/94; 210/98; 210/100; 210/234; 210/418; 73/198; 137/68.1; 251/20

[58] Field of Search .................. 210/88, 91, 94, 98, 210/100, 103, 145, 147, 234, 418, 541, 542; 73/198; 137/68.1; 251/20

[56] References Cited

U.S. PATENT DOCUMENTS

| | | | |
|---|---|---|---|
| 1,808,212 | 6/1931 | Earl | 73/198 |
| 1,936,301 | 11/1932 | Hansen et al. | 137/68.1 |
| 2,367,402 | 1/1945 | Kelly | 137/68.1 |
| 2,613,683 | 10/1952 | Baird et al. | 137/68.1 |
| 4,437,347 | 3/1984 | Bronsky et al. | 73/198 |
| 4,586,569 | 5/1986 | Hyde | 166/317 |
| 4,611,617 | 9/1986 | Hewitt | 137/68.1 |
| 4,681,677 | 7/1987 | Kuh et al. | 210/88 |

Primary Examiner—Richard V. Fisher
Assistant Examiner—Richard D. Jordan
Attorney, Agent, or Firm—George H. Gerstman

[57] ABSTRACT

A fluid metering device (10) is provided for automatically restricting (i.e., shutting off or reducing) fluid flow to a filter (16). The metering device (10) has a vane (32) which turns as fluid flows and thereby drives a gear (92). Once the vane (32) has rotated a selected number of times, as a result of the fluid flow, the rotation of the gear will break a frangible link (82), causing the fluid flow to stop or reduce by closing a valve (60). The customer will know to replace the filter (16) when the fluid no longer flows or is substantially reduced, and the customer will also have to replace the frangible link (82) to enable the fluid to flow at full volume again.

23 Claims, 2 Drawing Sheets

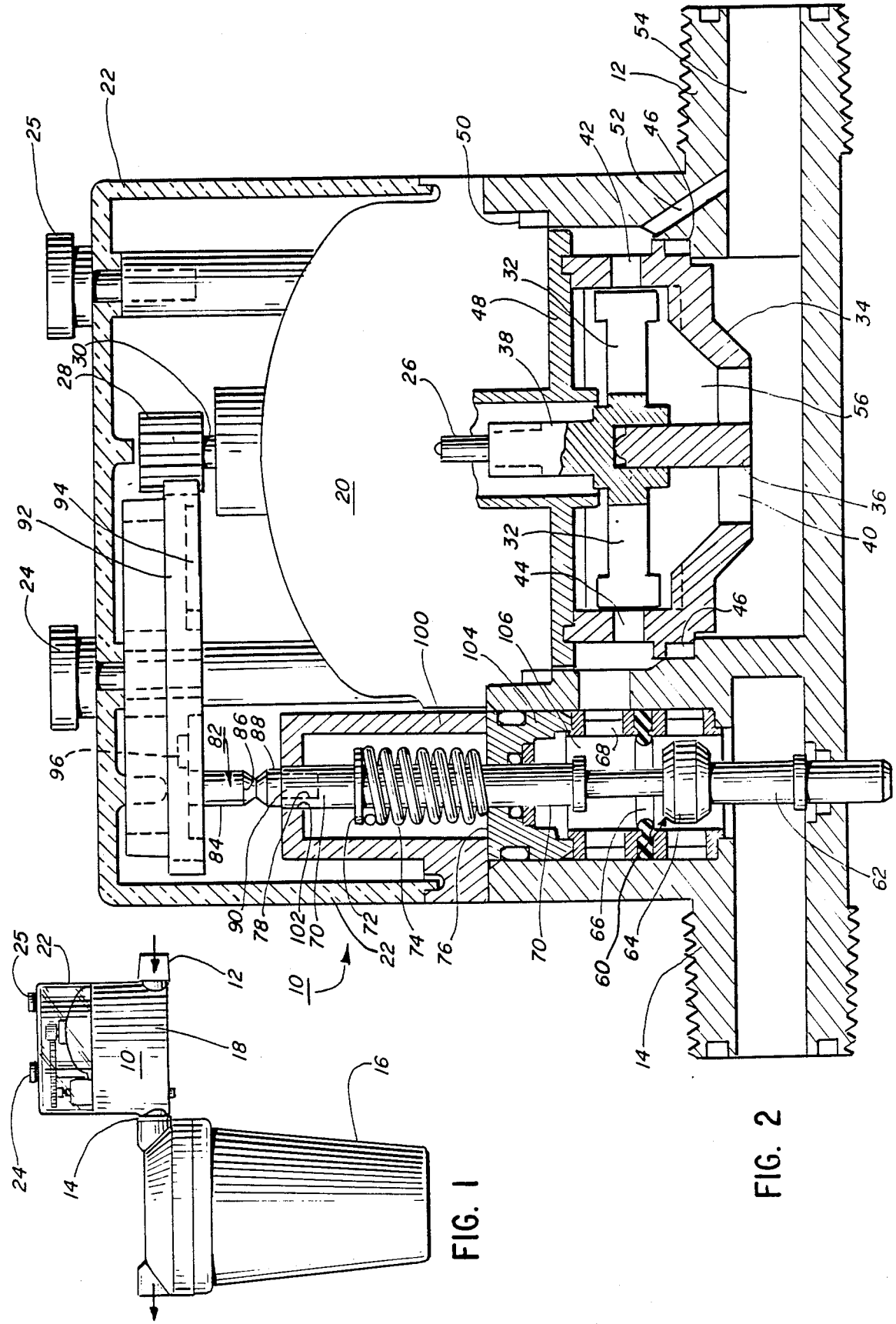

AUTOMATIC METERING SYSTEM

TECHNICAL FIELD

The present invention concerns a novel fluid metering device which can, for example, be used in metering an amount of water flow.

BACKGROUND OF THE INVENTION

Fluid treatment equipment, including water treatment equipment, ordinarily requires that the treatment medium be replaced or rejuvenated periodically. For example, water purification installations typically utilize a filter which must be replaced periodically. Often the customer will ignore the replacement of the filter and the water will not be purified properly. The product water resulting from using a filter which had not been replaced when necessary may be contaminated and deleterious to health. It is desirable, therefore, that the customer be effectively forced to replace the filter when such replacement is required.

An object of the present invention is to provide a fluid metering device which automatically discontinues or substantially reduces fluid flow when a predetermined amount of fluid has flowed. By reducing flow rather than completely stopping it, the customer is made aware of the need for filter replacement without being forced to use an untreated water supply from another tap. Some applications, however, such as arsenic removal, require the complete shutoff of the flow stream.

Another object of the present invention is to provide a fluid metering device that is simple in construction and efficient to manufacture.

A still further object of the present invention is to provide a fluid metering device which can be placed in the fluid line with a fluid treatment device, and effectively forces the customer to replace the treatment medium once a predetermined amount of fluid has flowed.

Another object of the present invention is to provide a fluid metering device that is useful for metering various types of fluids, including water, and can be used in conjunction with various types of fluid treatment media, including but not limited to filters, regeneration equipment, rejuvenation equipment, water softening media, fluid enhancement media, fluid cleaning media, etc.

Other objects and advantages of the present invention will become apparent as the description proceeds.

SUMMARY OF THE INVENTION

In accordance with the present invention, a fluid metering device is provided which includes a housing having an inlet and an outlet. Movable means are within the housing for movement in response to fluid flow. A valve is provided which is normally in a first position, to permit fluid flow, from the inlet to the outlet. Means are provided for placing the valve into a second position, restricting fluid flow, after a predetermined amount of fluid has flowed. In one embodiment, the valve incorporates a small fixed bypass port wherein a small flow stream will continue after the valve is in its second position. A frangible member is located within the housing and is adapted to break when the predetermined amount of fluid has flowed. Drive means are coupled to the movable means for breaking a frangible member when the predetermined amount of fluid has flowed.

In the illustrative embodiments, the movable means comprises a rotatable vane that is positioned between the inlet and the outlet for rotation in response to fluid flow and with the rotational velocity of the vane being in proportion to the magnitude of the fluid flow.

In the illustrative embodiments, the valve comprises a spring biased rod carrying a valve member and a valve chamber having a valve seat. The rod is spring biased from the first position in which the valve member and valve seat are spaced to the second position to close the valve member and valve seat after the predetermined amount of fluid has flowed.

In the illustrative embodiments, the frangible member comprises a replaceable shear pin that is connected to the spring biased rod. The drive means comprises reduction gearing and a driven gear positioned adjacent the frangible member, with the driven gear being adapted to break the frangible member when the predetermined amount of fluid has flowed. The driven gear defines a slot for capturing the shear pin when the driven gear has turned to a position in which the shear pin and the slot are aligned, so that any further movement of the driven gear will break the shear pin.

A more detailed explanation of the invention is provided in the following description and claims, and is illustrated in the accompanying drawings.

BRIEF DESCRIPTION OF THE DRAWINGS

FIG. 1 is a front view of a fluid metering device and filter constructed in accordance with the principles of the present invention;

FIG. 2 is a cross-sectional elevation of the fluid metering device of FIG. 1.

DETAILED DESCRIPTION OF THE ILLUSTRATIVE EMBODIMENT

Figure 3:
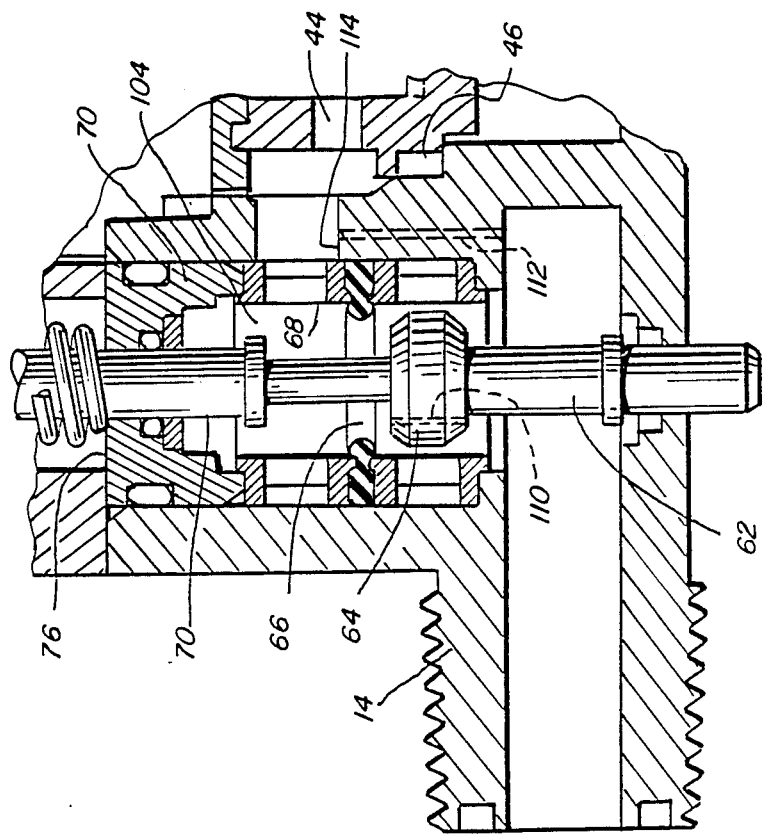
FIG. 3 is a fragmentary cross-sectional elevation of another embodiment of the fluid metering device.

In FIG. 1 the fluid metering device comprises an automatic shutoff meter 10 having an inlet 12 and an outlet 14 which is connected to the inlet of a water filter 16. Once a predetermined amount of water has flowed through meter 10, a frangible link will break and a valve within meter 10 will close to restrict (i.e., discontinue or reduce) further water flow. A filter replacement kit may be provided in which the kit includes the filter and a replacement link for the broken frangible link within meter 10. The customer will replace filter 16 and in order for the system to be reoperated, the replacement frangible link will have to be put in place within meter 10.

The details of construction of meter 10 are illustrated in FIG. 2. Referring to FIG. 2, the meter 10 comprises a bottom housing section 18 which includes inlet 12 and outlet 14, an intermediate gear section 20 and a cap 22 that may be light-transmissive, if desired, to enable viewing of the components enclosed within the cap 22. A pair of bolts 24, 25 are provided for connecting the cap 22 to the gear portion 20. Gear portion 20 contains conventional reduction gearing, connected to shaft 26, for providing a high gear ratio between the rotation of the gear that is directly fastened to shaft 26 and the rotation of pinion 28 which is keyed to shaft 30. As an example, although no limitation is intended, pinion 28 will turn only once for one million rotations of shaft 26.

Vanes 32 are rotatably mounted within the lower housing 18, so that the vanes will rotate with a velocity that is in proportion to the magnitude of the water flow.

Vanes 32 are enclosed within an assembly 34 having a central riser 36 for supporting the vanes centrally and for supporting the shaft holder 38 to which main shaft 26 is connected. Assembly 34 defines a circular bottom opening 40, inlet side opening 42 and outlet side opening 44, with the assembly being sealed to the casing of the lower housing by means of O-ring 46. A gear separation member 48 is connected to the top of assembly 40 and is sealed to the housing casing by O-ring 50.

Inlet 12 has a channel 52 communicating with inlet opening 54 for enabling the water to flow via channel 52 and opening 42 into the vane chamber 56 to cause rotation of vanes 32. Water flow from the inlet will also pass via opening 40 into chamber 56 and the water will exit via opening 44.

A valve 60 is provided adjacent the outlet 14 to enable the water to flow when the valve is in a first position (as illustrated in FIG. 2) and to terminate water flow when the valve is in a second position to be described. Valve 60 comprises a rod 62 carrying a valve member 64 which cooperates with valve seat 66. In the position illustrated, valve member 64 is spaced from valve seat 66 to permit water flow via opening 44 and opening 68, through valve seat 66, around valve member 64 and out of outlet 14.

Rod 62 has an upper portion 70 with a ring 72 affixed thereto. A spring 74 surrounds upper portion 70 and is compressed against wall 76 by ring 72. Upper portion 70 defines a centrally located slot 78 at its upper end 80 and a shear pin 82 is positioned within slot 78. Shear pin 82 comprises a frangible member having an upper section 84, a weakened shear area 86 and a lower section 88 with an extending portion 90 that fits snugly within slot 78. When shear pin 82 is in position within upper member 70 of rod 62, the valve member 64 will be spaced from valve seat 66 as illustrated. However, once shear pin 82 breaks, rod 62 will move upwardly under the force provided by spring 74 against ring 72, and valve member 64 and valve seat 68 will close, terminating water flow.

Pinion 28 is coupled to a driven gear 92 which defines a circular recess 94 in which circular recess 94 shear pin 82 rides during operation of the meter. A slot 96 is defined by driven gear 92 at one location of recess 94. When driven gear 92 turns so that slot 96 overlies shear pin 82, the shear pin will become captured within slot 96 and further turning of driven gear 92 will shear the pin 82, causing valve rod 62 to rise and close valve member 64 against valve seat 66. Water flow will terminate and the meter cannot be operated again to permit water flow until shear pin 82 has been replaced.

As illustrated in FIG. 2, valve rod 62 is carried within a valve assembly that includes a spring housing 100 defining a top opening 102 for upper portion 70 and a lower assembly 104 which has upper wall 76 against which spring 74 is positioned, and defining a chamber 106 for the water and the valve rod movement.

It is desirable that shear pin 82 be formed of a material that is difficult to repair, such as nylon, Teflon polymer or delrin polymer. In this manner, the customer cannot simply repair the shear pin and replace it without using a new kit containing both a replacement filter and a new shear pin.

It is important that the shear pin 82 shear prior to the closing of valve member 64 against valve seat 66 in order for water flow to enable the turning of the driven gear 92 to shear the shear pin 82. To this end, slot 96 is constructed so that capture of the shear pin 82 within slot 96 will not seat valve member 64 against valve seat 66 until the shear pin 82 is broken.

FIG. 3 comprises a meter that is identical to the meter of FIG. 2 except that there is a bypass port 110 extending through valve member 64 so that even if valve member 64 is seated on valve seat 68 there will be some, albeit reduced, water flow.

Alternatively a port 112, extending through frame 114, could be provided in lieu of bypass port 110 or in addition to bypass port 110, in order to provide some water flow even if valve member 64 is seated on valve seat 68.

Although illustrative embodiments of the invention have been shown and described, however, it is to be understood that various modifications and substitutions may be made by those skilled in the art without departing from the novel spirit and scope of the present invention.

What is claimed is:

1. A fluid metering device which comprises:
   a housing having an inlet and an outlet;
   movable means within the housing for movement in response to fluid flow;
   a valve that is normally in a first position, to permit fluid flow, from the inlet to the outlet;
   means for placing said valve into a second position, restricting fluid flow, after a predetermined amount of fluid has flowed;
   said valve placing means including a frangible member located within the housing and in a position to be broken by a drive means coupled to said movable means when said predetermined amount of fluid has flowed;
   said drive means coupled to said movable means for breaking said frangible member when said predetermined amount of fluid has flowed;
   means coupling said frangible member to said valve to prevent said valve from moving from said first position to said second position until said frangible member has broken; and
   said valve being inoperable for return to said first position from said second position unless said broken frangible member is replaced.

2. A fluid metering device as described in claim 1, in which fluid flow is blocked when said valve is in said second position.

3. A fluid metering device as described in claim 1, in which fluid flow is reduced when said valve is in said second position.

4. A fluid metering device as described in claim 1, in which said movable means comprises a rotatable vane that is positioned between the inlet and the outlet for rotation in response to fluid flow and with the rotational velocity of the vane being in proportion to the magnitude of the fluid flow.

5. A fluid metering device as described in claim 1, said valve comprising a spring biased rod carrying a valve member, a valve chamber having a valve seat, said rod being spring biased from said first position in which said valve member and valve seat are spaced to said second position to close said valve member and valve seat, after said predetermined amount of fluid has flowed.

6. A fluid metering device as described in claim 1, said frangible member comprising a replaceable shear pin.

7. A fluid metering device as described in claim 5, said frangible member comprising a replaceable shear pin connected to said spring biased rod.

8. A fluid metering device as described in claim 1, said drive means comprising reduction gearing and a driven gear positioned adjacent said frangible member, said driven gear being adapted to break said frangible member when said predetermined amount of fluid has flowed.

9. A fluid metering device as described in claim 7, said drive means comprising reduction gearing and a driven gear positioned adjacent said frangible member, said driven gear being adapted to break said frangible member when said predetermined amount of fluid has flowed, said driven gear defining a slot for capturing said shear pin when said driven gear has turned to a position in which said shear pin and said slot are aligned, so that any further movement of said driven gear will break said shear pin.

10. A fluid metering device as described in claim 9, said driven gear defining a circular recess within which said shear pin rides during rotation of said driven gear, said slot being located at one location within said recess.

11. A fluid metering device which comprises:
a housing having an inlet and an outlet;
movable means within the housing for movement in response to fluid flow, said movable means comprising a rotatable vane that is positioned between the inlet and the outlet for rotation in response to fluid flow and with the rotational velocity of the vane being in proportion to the magnitude of the fluid flow;
a valve that is normally in a first position, to permit fluid flow, from the inlet to the outlet, said valve comprising a spring biased rod carrying a valve member, a valve chamber having a valve seat, said rod being spring biased from said first position in which said valve member and valve seat are spaced to a second position, restricting fluid flow, after a predetermined amount of fluid has flowed;
a frangible member located within the housing and in a position to be broken by a drive means coupled to said movable means when said predetermined amount of fluid has flowed, said frangible member comprising a replaceable shear pin connected to said spring biased rod;
said drive means coupled to said movable means for breaking said frangible member when said predetermined amount of fluid has flowed, said drive means comprising reduction gearing and a driven gear positioned adjacent said frangible member, said driven gear being adapted to break said frangible member when said predetermined amount of fluid has flowed;
means coupling said frangible member to said valve to prevent said valve from moving from said first position to said second position until said frangible member has broken; and
said valve being inoperable for return to said first position from said second position unless said broken frangible member is replaced.

12. A fluid metering device as described in claim 11, said driven gear defining a slot for capturing said shear pin when said driven gear has turned to a position in which said shear pin and said seat are aligned, so that any further movement of said driven gear will break said shear pin.

13. A fluid metering device as described in claim 12, said driven gear defining a circular recess within which said shear pin rides during rotation of said driven gear, said slot being located at one location within said recess.

14. A fluid filtering system, which comprises:
a fluid conduit;
a replaceable filter in said conduit;
a fluid metering device in said conduit for metering the fluid to determine when the filter should be replaced, said device comprising
a housing having an inlet and an outlet connected to said fluid conduit;
movable means within the housing for movement in response to fluid flow;
a valve that is normally in a first position, to permit fluid flow, from the inlet to the outlet;
means for placing said valve into a second position, restricting fluid flow, after a predetermined amount of fluid has flowed;
said valve placing means including a frangible member located within the housing and in a position to be broken by a drive means coupled to said movable means when said predetermined amount of fluid has flowed;
said drive means coupled to said movable means for breaking said frangible member when said predetermined amount of fluid has flowed;
means coupling said frangible member to said valve to prevent said valve from moving from said first position to said second position until said frangible member has broken; and
said valve being inoperable for return to said first position from said second position unless said broken frangible member is replaced.

15. A fluid filtering system as described in claim 14, said movable means comprising a rotatable vane that is positioned between the inlet and outlet for rotation in response to fluid flow and with the rotational velocity of the vane being in proportion to the magnitude of the fluid flow.

16. A fluid filtering system as described in claim 14, said valve comprising a spring biased rod carrying a valve member, a valve chamber having a valve seat, said rod being spring biased from said first position in which said valve member and said valve seat are spaced to said second position to close said valve member and valve seat after said predetermined amount of fluid has flowed.

17. A fluid filtering system as described in claim 14, said frangible member comprising a replaceable shear pin.

18. A fluid filtering system as described in claim 17, said frangible member comprising a replaceable shear pin connected to said spring biased rod.

19. A fluid filtering system as described in claim 14, said drive means comprising reduction gearing and a driven gear positioned adjacent said frangible member, said driven gear being adapted to break the frangible member when said predetermined amount of fluid has flowed.

20. A fluid metering device as described in claim 18, said drive means comprising reduction gearing and a driven gear positioned adjacent said frangible member, said driven gear being adapted to break said frangible member when said predetermined amount of fluid has flowed, said driven gear defining a slot for capturing said shear pin when said driven gear has turned to a position in which said shear pin and said slot are aligned, so that any further movement of said driven gear will break said shear pin.

21. A fluid filtering system as described in claim 20, said driven gear defining a circular recess within which said shear pin rides during rotation of said driven gear, said slot being located at one location within said recess.

22. A water treatment kit for use with a water metering device having a housing, movable means within the housing for movement in response to water flow, a valve that is normally in a first position to permit fluid flow and means for placing the valve into a second position restricting fluid flow after a predetermined amount of fluid has flowed and drive means coupled to the movable means for breaking a frangible member when a predetermined amount of fluid has flowed, and with the valve being inoperable for return to the first position from the second position until the frangible member is replaced, which comprises:
- a replaceable fluid treatment medium including means for coupling it to the fluid metering device; and
- a frangible means for positioning adjacent said drive means, said frangible means being adapted to maintain the valve in its first position until a predetermined amount of fluid has flowed and adapted to be broken by the drive means when said predetermined amount of fluid has flowed; said frangible means including means for coupling it to the valve to prevent the valve from moving from the first position to the second position until the frangible means is broken.

23. A fluid treatment kit as described in claim 22, in which said frangible means comprises a replaceable shear pin.

* * * * *